United States Patent
Lewis et al.

(10) Patent No.: US 10,331,573 B2
(45) Date of Patent: Jun. 25, 2019

(54) DETECTION OF AVOIDABLE CACHE THRASHING FOR OLTP AND DW WORKLOADS

(71) Applicant: Oracle International Corporation, Redwood Shores, CA (US)

(72) Inventors: Justin Matthew Lewis, San Carlos, CA (US); Zuoyu Tao, Belmont, CA (US); Jia Shi, Burlingame, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/687,296

(22) Filed: Aug. 25, 2017

(65) Prior Publication Data

US 2018/0129612 A1 May 10, 2018

Related U.S. Application Data (60) Provisional application No. 62/418,005, filed on Nov. 4, 2016.

(51) Int. Cl.
 *G06F 12/00* (2006.01)
 *G06F 12/121* (2016.01)
 *G06F 12/0891* (2016.01)

(52) U.S. Cl.
 CPC ........ *G06F 12/121* (2013.01); *G06F 12/0891* (2013.01); *G06F 2212/1021* (2013.01); *G06F 2212/466* (2013.01)

(58) Field of Classification Search
 None
 See application file for complete search history.

(56) References Cited

U.S. PATENT DOCUMENTS

| | | | |
|---|---|---|---|
| 4,425,615 | A | 1/1984 | Swenson et al. |
| 4,463,424 | A | 7/1984 | Mattson et al. |

(Continued)

FOREIGN PATENT DOCUMENTS

| | | |
|---|---|---|
| CN | 101150483 A | 3/2008 |
| GB | 2409 301 A | 6/2005 |

(Continued)

OTHER PUBLICATIONS

Kakarla, U.S. Appl. No. 14/489,221, filed Sep. 17, 2014, Interview Summary, dated Nov. 9, 2017.

(Continued)

*Primary Examiner* — David Yi
*Assistant Examiner* — Craig S Goldschmidt
(74) *Attorney, Agent, or Firm* — Hickman Palermo Becker Bingham LLP (57) ABSTRACT

Techniques are provided to adjust the behavior of a cache based on a count of cache misses for items recently evicted. In an embodiment, a computer responds to evicting a particular item (PI) from a cache by storing a metadata entry for the PI into memory. In response to a cache miss for the PI, the computer detects whether or not the metadata entry for the PI resides in memory. When the metadata entry for the PI is detected in memory, the computer increments a victim hit counter (VHC) that may be used to calculate how much avoidable thrashing is the cache experiencing, which is how much thrashing would be reduced if the cache were expanded. Either immediately or arbitrarily later, the computer adjusts a policy of the cache based on the VHC's value. For example, the computer may adjust the capacity of the cache based on the VHC.

22 Claims, 7 Drawing Sheets

(56) References Cited

U.S. PATENT DOCUMENTS

| | | | |
|---|---|---|---|
| 5,394,531 A * | 2/1995 | Smith | G06F 12/0866 |
| | | | 711/129 |
| 5,717,893 A | 2/1998 | Mattson | |
| 5,765,034 A | 6/1998 | Recio | |
| 6,044,367 A | 3/2000 | Wolff | |
| 6,457,105 B1 | 9/2002 | Spencer et al. | |
| 6,526,483 B1 | 2/2003 | Cho et al. | |
| 6,728,823 B1 | 4/2004 | Walker et al. | |
| 6,886,084 B2 | 4/2005 | Kawashima et al. | |
| 6,922,754 B2 | 7/2005 | Liu et al. | |
| 6,928,451 B2 | 8/2005 | Mogi et al. | |
| 7,036,147 B1 | 4/2006 | Hursey | |
| 7,069,324 B1 | 6/2006 | Tiwana et al. | |
| 7,093,162 B2 | 8/2006 | Barga et al. | |
| 7,159,076 B2 | 1/2007 | Madter | |
| 7,165,144 B2 | 1/2007 | Choubal et al. | |
| 7,228,354 B2 | 6/2007 | Chambliss et al. | |
| 7,237,027 B1 | 6/2007 | Raccah et al. | |
| 7,290,090 B2 | 10/2007 | Madter | |
| 7,461,147 B1 | 12/2008 | Mowat et al. | |
| 7,506,103 B2 | 3/2009 | Madter | |
| 7,636,814 B1 | 12/2009 | Karr et al. | |
| 7,660,945 B1 | 2/2010 | Lee | |
| 7,769,802 B2 | 8/2010 | Smith | |
| 7,836,262 B2 | 11/2010 | Gunna | |
| 7,904,562 B2 | 3/2011 | Takase et al. | |
| 8,145,806 B2 | 3/2012 | Lee et al. | |
| 8,244,984 B1 | 8/2012 | Glasco et al. | |
| 8,326,839 B2 | 12/2012 | Idicula et al. | |
| 8,327,080 B1 | 12/2012 | Der | |
| 8,359,429 B1 | 1/2013 | Sharma et al. | |
| 8,370,452 B2 | 2/2013 | Harvell et al. | |
| 8,521,923 B2 | 8/2013 | Lee et al. | |
| 8,683,139 B2 | 3/2014 | Gaither | |
| 8,868,707 B2 | 10/2014 | Menta et al. | |
| 8,868,831 B2 | 10/2014 | Badrinarian | |
| 8,874,807 B2 | 10/2014 | Lee et al. | |
| 9,003,159 B2 | 4/2015 | Deshkar | |
| 9,256,542 B1 | 2/2016 | Flower | |
| 9,361,232 B2 | 6/2016 | Umamageswarm et al. | |
| 9,405,694 B2 | 8/2016 | Goyal et al. | |
| 2002/0143755 A1 | 10/2002 | Wynblatt et al. | |
| 2003/0115324 A1 | 6/2003 | Blumeanau et al. | |
| 2004/0003087 A1 | 1/2004 | Chambliss et al. | |
| 2004/0054860 A1 | 3/2004 | Dixit | |
| 2004/0062106 A1 | 4/2004 | Ramesh et al. | |
| 2004/0117441 A1 | 6/2004 | Liu et al. | |
| 2004/0148486 A1 | 7/2004 | Burton | |
| 2004/0215626 A1 | 10/2004 | Colossi et al. | |
| 2004/0225845 A1 | 11/2004 | Kruckemyer et al. | |
| 2004/0230753 A1 | 11/2004 | Amiri | |
| 2004/0254943 A1 | 12/2004 | Malcolm | |
| 2005/0056520 A1 | 4/2005 | Dharmapurikar et al. | |
| 2005/0120025 A1 | 6/2005 | Rodriguez et al. | |
| 2005/0160224 A1 | 7/2005 | Cuomo et al. | |
| 2005/0193160 A1 | 9/2005 | Bhatt et al. | |
| 2005/0210202 A1 | 9/2005 | Choubal et al. | |
| 2005/0283637 A1 | 12/2005 | Coldicott et al. | |
| 2006/0106890 A1 | 5/2006 | Paul et al. | |
| 2006/0209444 A1 | 9/2006 | Song | |
| 2006/0218123 A1 | 9/2006 | Chowdhuri et al. | |
| 2006/0224451 A1 | 10/2006 | Kerschbrock et al. | |
| 2006/0224551 A1 | 10/2006 | Lariba-Pey | |
| 2006/0271605 A1 | 11/2006 | Petruzzo | |
| 2006/0271740 A1 | 11/2006 | Mark | |
| 2006/0277439 A1 | 12/2006 | Davia et al. | |
| 2007/0067575 A1 | 3/2007 | Morris et al. | |
| 2007/0124415 A1 | 5/2007 | Lev-Ran et al. | |
| 2007/0220348 A1 | 9/2007 | Mendoza et al. | |
| 2007/0260819 A1 | 11/2007 | Gao et al. | |
| 2007/0271570 A1 | 11/2007 | Brown et al. | |
| 2008/0016283 A1 | 1/2008 | Madter | |
| 2008/0046736 A1 | 2/2008 | Arimilli et al. | |
| 2008/0104283 A1 | 5/2008 | Shin et al. | |
| 2008/0104329 A1 | 5/2008 | Gaither et al. | |
| 2008/0147599 A1 | 6/2008 | Young-Lai | |
| 2008/0155229 A1 | 6/2008 | Beyer et al. | |
| 2008/0177803 A1 | 7/2008 | Fineberg et al. | |
| 2008/0244209 A1 | 10/2008 | Seelam et al. | |
| 2008/0307266 A1 | 12/2008 | Chandrasekaran | |
| 2009/0164536 A1 | 6/2009 | Nasre et al. | |
| 2009/0182960 A1 | 7/2009 | Crockett | |
| 2009/0193189 A1 | 7/2009 | Carswell et al. | |
| 2009/0248871 A1 | 10/2009 | Takase et al. | |
| 2010/0017556 A1 | 1/2010 | Chin et al. | |
| 2010/0077107 A1 | 3/2010 | Potapov et al. | |
| 2010/0082648 A1 | 4/2010 | Potapov et al. | |
| 2010/0158486 A1 | 6/2010 | Moon | |
| 2010/0274962 A1 | 6/2010 | Moesk | |
| 2010/0199042 A1 | 8/2010 | Bates | |
| 2010/0205367 A1 | 8/2010 | Ehrlich | |
| 2010/0332901 A1 | 12/2010 | Nussbaum et al. | |
| 2011/0022801 A1 | 1/2011 | Flynn | |
| 2011/0040861 A1 | 2/2011 | Van der Merwe | |
| 2011/0047084 A1 | 2/2011 | Manzalini et al. | |
| 2011/0066791 A1 | 3/2011 | Goyal | |
| 2011/0153719 A1 | 6/2011 | Santoro | |
| 2011/0173325 A1 | 7/2011 | Cherian et al. | |
| 2011/0191543 A1 | 8/2011 | Craske et al. | |
| 2011/0238899 A1 | 9/2011 | Yano | |
| 2011/0320804 A1 | 12/2011 | Chan et al. | |
| 2012/0124296 A1 * | 5/2012 | Bryant | G06F 9/3861 |
| | | | 711/136 |
| 2012/0144234 A1 | 6/2012 | Clark et al. | |
| 2012/0159480 A1 | 6/2012 | Matsuzawa | |
| 2013/0086330 A1 | 4/2013 | Baddepudi et al. | |
| 2013/0275402 A1 | 10/2013 | Zhou et al. | |
| 2013/0326152 A1 | 12/2013 | Loaiza et al. | |
| 2014/0089565 A1 | 3/2014 | Lee | |
| 2014/0149638 A1 | 5/2014 | Jain | |
| 2014/0281167 A1 | 9/2014 | Danilak | |
| 2014/0281272 A1 | 9/2014 | Loaiza et al. | |
| 2014/0337314 A1 | 11/2014 | Potapov et al. | |
| 2015/0006813 A1 | 1/2015 | Goyal et al. | |
| 2015/0012690 A1 | 1/2015 | Bruce | |
| 2015/0089121 A1 | 3/2015 | Coudhury et al. | |
| 2016/0117125 A1 * | 4/2016 | Starr | G06F 3/0625 |
| | | | 713/310 |
| 2017/0322886 A1 * | 11/2017 | Mukherjee | G06F 12/0888 |
| 2017/0357588 A1 * | 12/2017 | Moyer | G06F 12/0811 |

FOREIGN PATENT DOCUMENTS

| | | |
|---|---|---|
| JP | 2002-278704 A | 9/2002 |
| JP | 2003-150419 A | 5/2003 |
| JP | 2004-038758 A | 2/2004 |
| WO | WO 93/18461 | 9/1993 |

OTHER PUBLICATIONS

IBM TDB, "A Scheduling Algorithm for Processing Mutually Exclusive Workloads in a multi-system Configuration", ip.com dated Aug. 19, 2002 (3 pages).

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.

Loizos, M., et al., "Improving distributed join efficiency with extended bloom filter operations", Advanced Networking and Applications, 2007. AINA '07., 21st International Conference on IEEE, PI, May 1, 2007, pp. 187-194, ISBN: 978-0-7695-2846-5.

U.S. Appl. No. 12/691,146, filed Jan. 21, 2010, Examiners Answers, dated Apr. 29, 2013.

U.S. Appl. No. 12/691,146, filed Jan. 21, 2010, Office Action, dated Aug. 17, 2012.

(56) References Cited

OTHER PUBLICATIONS

U.S. Appl. No. 12/691,146, filed Jan. 21, 2010, Decision on Appeal, dated Sep. 29, 2015.
U.S. Appl. No. 12/691,146, filed Jan. 21, 2010, Examiners Answers, dated Dec. 1, 2016.
U.S. Appl. No. 12/691,146, filed Jan. 21, 2010, Final Office Action, dated Apr. 20, 2016.
U.S. Appl. No. 12/691,146, filed Jan. 21, 2010, Interview Summary, dated Mar. 21, 2016.
U.S. Appl. No. 12/691,146, filed Jan. 21, 2010, Office Action, dated Dec. 15, 2015.
U.S. Appl. No. 12/691,146, filed Jan. 21, 2010, Final Office Action, dated Nov. 1, 2012.
Kakarla, U.S. Appl. No. 14/489,221, filed Sep. 17, 2014, Notice of Allowance, dated Oct. 25, 2018.

* cited by examiner

DETECTION OF AVOIDABLE CACHE THRASHING FOR OLTP AND DW WORKLOADS

BENEFIT CLAIM

This application claims the benefit of Provisional Appln. 62/418,005, filed Nov. 14, 2016, the entire contents of which is hereby incorporated by reference as if fully set forth herein, under 35 U.S.C. § 119(e).

FIELD OF THE DISCLOSURE

This disclosure relates to cache control. Presented herein are techniques that opportunistically maximizes throughput by adjusting the behavior of a cache based on statistics such as a count of cache misses for items recently evicted, a count of cache hits, and/or similar metrics.

BACKGROUND

A computer system typically has a natural hierarchy of storage tiers. For example, a computer may have volatile dynamic random access memory (DRAM) for fast access to currently active data, a non-volatile flash drive for moderate-speed access to recently used data that may be needed again soon, and a mechanical disk or network storage for slow access to bulk durable storage. Because the storage tiers have different latencies and capacities, some data items may be replicated or moved between various storage tiers to ensure that data is dynamically distributed to storage tiers according to actual demand.

Random access tiers, such as volatile and non-volatile memory, may contain a cache that optimizes data residency based on a policy of the cache. For example, a least recently used (LRU) cache may evict data not recently used to make room for recently used data not already cached. Caching policies decide which data items are cacheable and how many data items are cached.

However the performance of cache policies, no matter how well designed, may not be optimal. For example, the quantity and quality of data access requests may fluctuate, such that at times a cache may be under- or over-utilized.

For example if a caching policy does not match a current workload, then cache thrashing may result. For example, a stressed cache may repeatedly evict and reload a same data item that would perform better if not evicted.

Likewise, an idle cache may consume memory that would increase throughput if instead used for other purposes. However although cache performance more or less depends on the nature of the workload, cache sizes typically do not dynamically adjust to suit fluctuating workload.

Thus, workload related performance degradations may arise. For example, a database table scan may trample the current cache contents as the scan passes over copious data that far exceeds the capacity of the cache. The scanned data may be read once during the scan and then not accessed again from the cache once read into cache.

Thus a scan may not only evict frequently used data, but also further aggravates the problem by filling the cache with data that is unlikely to be accessed again while in the cache. Thus a cache whose configuration and behavior is immutable will likely suffer degraded performance under various realistic loads.

Degraded performance, such as thrashing, costs extra time (latency) to load needed data. Furthermore if the cache is non-volatile, then thrashing may cause additional wear that may reduce the life of the cache's physical medium. Thus, cache thrashing may pose a capital cost and a reliability hazard, in addition to costing latency and energy.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Cache
   2.2 Data Item
   2.3 Cache Policy
   2.4 Eviction
   2.5 Metadata
   2.6 Cache Miss
   2.7 Thrashing
   2.8 Victim Hit Counter
   2.9 Policy Tuning
3.0 Thrash Detection Process
   3.1 Metadata Storage
   3.2 Metadata Detection
   3.3 Statistics
   3.4 Tuning
4.0 Metadata First-In First-Out (FIFO)
   4.1 Tiered Memory
   4.2 FIFO Data Flow
   4.3 FIFO Inspection
   4.4 Metadata Removal
5.0 Equilibrium Thresholds
   5.1 Thrashing Ratio
   5.2 I/O Latency 5.3 Data Categories
5.4 Cache Partitions
6.0 Data Structures
6.1 Linked List
6.2 Metadata Details
6.3 Random Access
7.0 Hardware Overview
8.0 Software Overview
9.0 Cloud Computing 1.0 General Overview Techniques are provided to adjust the behavior of a cache based on a count of cache misses for items recently evicted. In an embodiment, a computer responds to evicting a particular item from a cache by storing in an entry in metadata identifying the particular item. Metadata is stored in low latency random access memory (RAM). If the particular item is not subsequently requested, the metadata entry for the particular item may be removed under some conditions. In response to a cache miss for the particular item, the computer detects whether or not an entry in metadata identifies that particular item. When a metadata entry for the particular item is detected, the computer increments a victim hit counter. An increment represents a cache hit that could have occurred had the particular item been retained in cache (e.g. if the cache were somewhat larger). The victim hit counter may be used to calculate how much avoidable thrashing is the cache experiencing, which represents how much thrashing could be reduced if the cache were expanded. Either immediately or arbitrarily later, the computer adjusts a policy of the cache based on the value of the victim hit counter. For example, the computer may increase or decrease the capacity of the cache based on the victim hit counter. Particular resizing scenarios are discussed in a section titled "Policy Tuning" below.

In some embodiments, metadata entries are temporarily retained in a first-in first-out (FIFO). In some embodiments, FIFO performance is accelerated with a data structure such as a linked list.

In some embodiments, the cache is primarily dedicated to online transaction processing (OLTP) data. The cache may be dynamically tuned to opportunistically store lower priority data, such as binary large objects (BLOBs) or temporary sort data spills, when thrashing is low.

2.0 Example Computer

Figure 1:
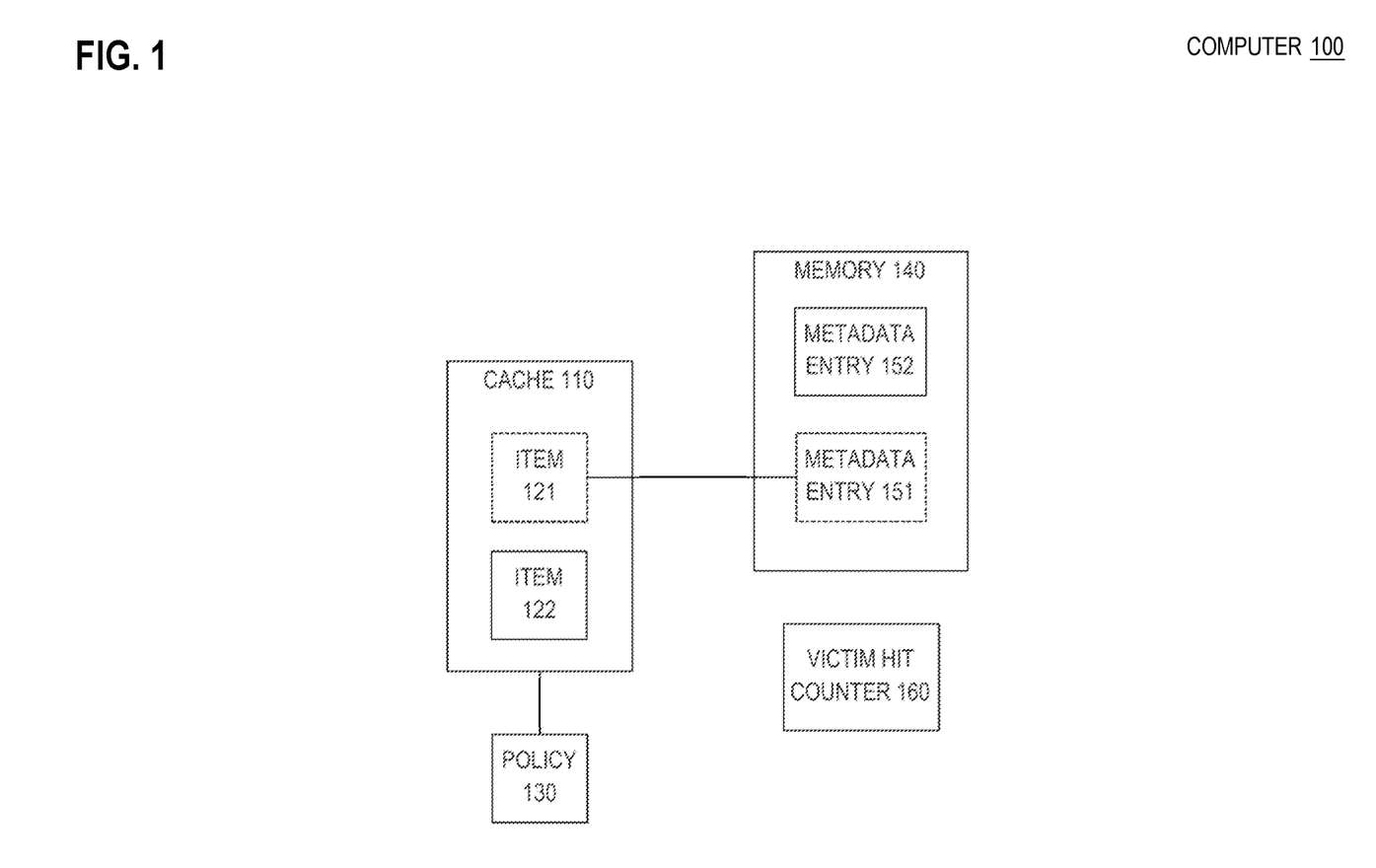
FIG. 1 is a block diagram that depicts an example computer that adjusts the behavior of a cache based on a count of cache misses for items recently evicted, in an embodiment.

FIG. 1 is a block diagram that depicts an example computer 100, in an embodiment. Computer 100 adjusts the behavior of a cache based on a count of cache misses for items recently evicted. Computer 100 may be a rack server such as a blade, a personal computer, a mainframe, a network appliance, a virtual machine, a smartphone, or other computing device. Computer 100 contains cache 110 and memory 140.

Memory 140 is random access memory (RAM) (e.g. byte addressable) that may be volatile such as dynamic RAM (DRAM) or static RAM (SRAM), or non-volatile such as flash. Cache 110 is an associative cache of data that is persisted elsewhere (not shown) such as on a local disk, network storage, or other bulk storage tier.

2.1 Cache

Cache 110 may be a write-through cache or a write-back cache. A write-through cache accelerates repeated reads and does not accelerate writes because a write-through cache flushes every write to a backing store (e.g. disk). A write-back cache accelerates repeated reads and all writes because buffering allows flushing to be deferred and thus removed from the critical path of a write. Cache 110 may have an implementation-specific associativity such as fully associative, set associative, or direct mapped. A fully associative cache allows data from any memory address to be stored in any available line of cache 110, thereby reducing a need to evict other data, but such flexibility needs additional silicon, which increases manufacturing cost, increases power consumption, and increases best-case (no eviction) latency. Direct mapping needs less silicon but requires data from a particular memory address to be stored only in a particular line of cache 110. Because multiple memory addresses may be directly mapped to a same line of cache 110, there may be increased contention for a particular line of cache 110 and thus more frequent evictions, Set associative is a compromise between fully associative and direct mapping, such that a particular memory address may be mapped to any of a subset of lines of cache 110. Cache 110 may reside in volatile or non-volatile RAM, or on a local drive such as a magnetic disk, flash drive, or hybrid drive. In some embodiments (not shown), memory 140 contains cache 110. Cache 110 contains many data items, such as 121-122. Cache 110 may store data items of mixed sizes.

2.2 Data Item

Item 121 may have a fixed size, such as a cache line, cache word, database block, disk block, or other atomic unit of stored data. Item 121 may have a variable size, such as a binary large object (BLOB) or other object, or database temporary data such as a sort spill (overflow) from volatile memory. Each of items 121-122 is identifiable according to recordable metadata entries that may be stored in memory 140, such as metadata entry 152. Thus, metadata entry 152 identifies a data item (not shown).

Computer 100 controls which metadata entries reside in memory 140. In some embodiments, metadata entries in memory 140 are contained within an aggregation data structure (not shown) such as an array, linked list, or hash table that resides within memory 140.

2.3 Cache Policy

Computer 100 operates cache 110 according to policy 130, which is dynamically adjustable. Policy 130 may specify a capacity (size) of cache 110, different treatment for different categories of data items, or other operational parameters that affect the configuration or behavior of cache 110.

2.4 Eviction

Cache 110 has limited capacity. Thus, inserting one item into cache 110 may require eviction (removal) of another item from cache 110. In this example, item 121 is drawn with dashed lines to show that it is being evicted from cache 110. If cache 110 is a write-back cache and item 121 is dirty (modified), then eviction includes computer 100 writing item 121 to persistent storage, such as disk.

2.5 Metadata

However regardless of whether cache 110 is write-back or write-through, computer 100 performs additional work with memory 140 during eviction. When computer 100 evicts an item from cache 110, computer 100 records the metadata entry for the item into memory 140. For example when computer 100 evicts item 121, computer 100 stores metadata entry 151 into memory 140 to record that item 121 was recently evicted. Metadata entry 151 is drawn with dashed lines to show that it is being inserted into memory 140.

2.6 Cache Miss

In operation, computer 100 may experience a cache miss when retrieving a data item that does not reside within cache 110. Because item 121 was evicted in this example, item 121 no longer resides in cache 110. Thus, a subsequent attempt to find item 121 within cache 110 will cause a cache miss. In addition to conventional handling of a cache miss, such as retrieving item 121 from durable storage and inserting item 121 into cache 110, computer 100 also does additional processing for a cache miss.

During a cache miss, computer 100 detects whether or not memory 140 contains a metadata entry for the item of the cache miss. For example during a cache miss for item 121, computer 140 detects whether or not memory 140 contains metadata entry 151, which is the metadata entry for item 121.

In some embodiments, metadata entries in memory 140 are aggregated within a container (not shown) that resides within memory 140 and that encapsulates functionality for detecting the presence or absence of a particular metadata entry. For example, metadata entries 151-152 may reside in a tree or hash table (within memory 140) that may look up (e.g. linearly scan or randomly access) a particular metadata entry.

If memory 140 contains metadata entry 151, then computer 100 performs two more activities. First, computer 100 increments victim hit counter 160. Second, computer 100 removes metadata entry 151 from memory 140. It is that removal of a metadata entry during a cache miss that ensures that: a) an item may reside in cache 110, or b) the item's metadata may reside in memory 140, but both may not be simultaneously resident. Furthermore sometimes, neither may be resident.

2.7 Thrashing

Thrashing is turnover (replacement) of cache contents, which adds latency, such as for input/output (I/O). Thrashing occurs when demand for storage within cache 110 exceeds the capacity of cache 110, assuming that cache 110 is a fully associative cache. Without full associativity, thrashing may occur even when cache 110 has spare capacity because some memory address must contend for a same line of cache 110. Generally, a small cache may thrash more than a large cache. Thus, increasing a size of a cache may decrease thrashing. However, it may be difficult to dynamically and accurately predict how much the size of cache 110 should be increased to decrease thrashing by a desired amount. Techniques herein may accurately recognize avoidable thrashing as a trigger for optimally resizing cache 110.

2.8 Victim Hit Counter

According to an embodiment, avoidable thrashing of cache 110 is measured by victim hit counter 160, such that a large count indicates much avoidable thrashing. In some embodiments, computer 100 periodically resets victim hit counter 160 to zero.

In some embodiments, a victim hit rate may be calculated by dividing the value of victim hit counter 160 by the length of the duration between periodic counter resets. For a given duration, a ratio of victim hit count to cache hit count will have a same value as a ratio of victim hit rate to cache hit rate. Thus, such ratios may be interchangeable. Thus, embodiments may use either a hit count ratio or a hit rate ratio. Thus, examples herein that use one such ratio may instead be implemented with the other ratio.

Thrashing may be somewhat alleviated by tuning the operation of cache 110. Based on victim hit counter 160, computer 100 adjusts policy 130 to tune the performance of cache 110 in response to detecting too little or too much avoidable thrashing. A relationship between victim hit counter 160 and a count of actual hits within cache 110 is discussed later herein.

2.9 Policy Tuning

Ideally, no avoidable thrashing is best, such as when victim hit counter 160 is idle (zero). In less than ideal conditions, cache 110 may be prone to avoidable thrashing.

Because some processing is more important than other processing, computer 100 may need to prioritize caching for some data. Because cache demand may fluctuate with conditions, a need for preferential treatment of priority data may be only temporary. Thus, computer 100 may sometimes reserve cache 110 for more important data and sometimes not. For example, computer 100 may have a category of data that is sometimes excluded from cache 110 according to policy 130.

In some cases, system throughput may be maximized by adjusting policy 130 to allow caching of excluded data when avoidable thrashing is low. Likewise, adjusting policy 130 may cause the size (capacity) of cache 110 to change. For example when avoidable thrashing is too high, computer 100 may adjust policy 130 to expand cache 110. Likewise, cache 110 may shrink when avoidable thrashing is too low. Thus, cache 110 may (more or less temporarily) surrender some of its underlying storage medium (e.g. flash) for low-value or low-priority uses when avoidable thrashing is low, and then reclaim the surrendered capacity when avoidable thrashing becomes too high. Thus, computer 100 may use policy 130 and victim hit counter 160 to dynamically tune cache 110 according to changing load and conditions to maximize system throughput. With such techniques, the operation of computer 100 itself may be opportunistically accelerated.

3.0 Thrash Detection Process

Figure 2:
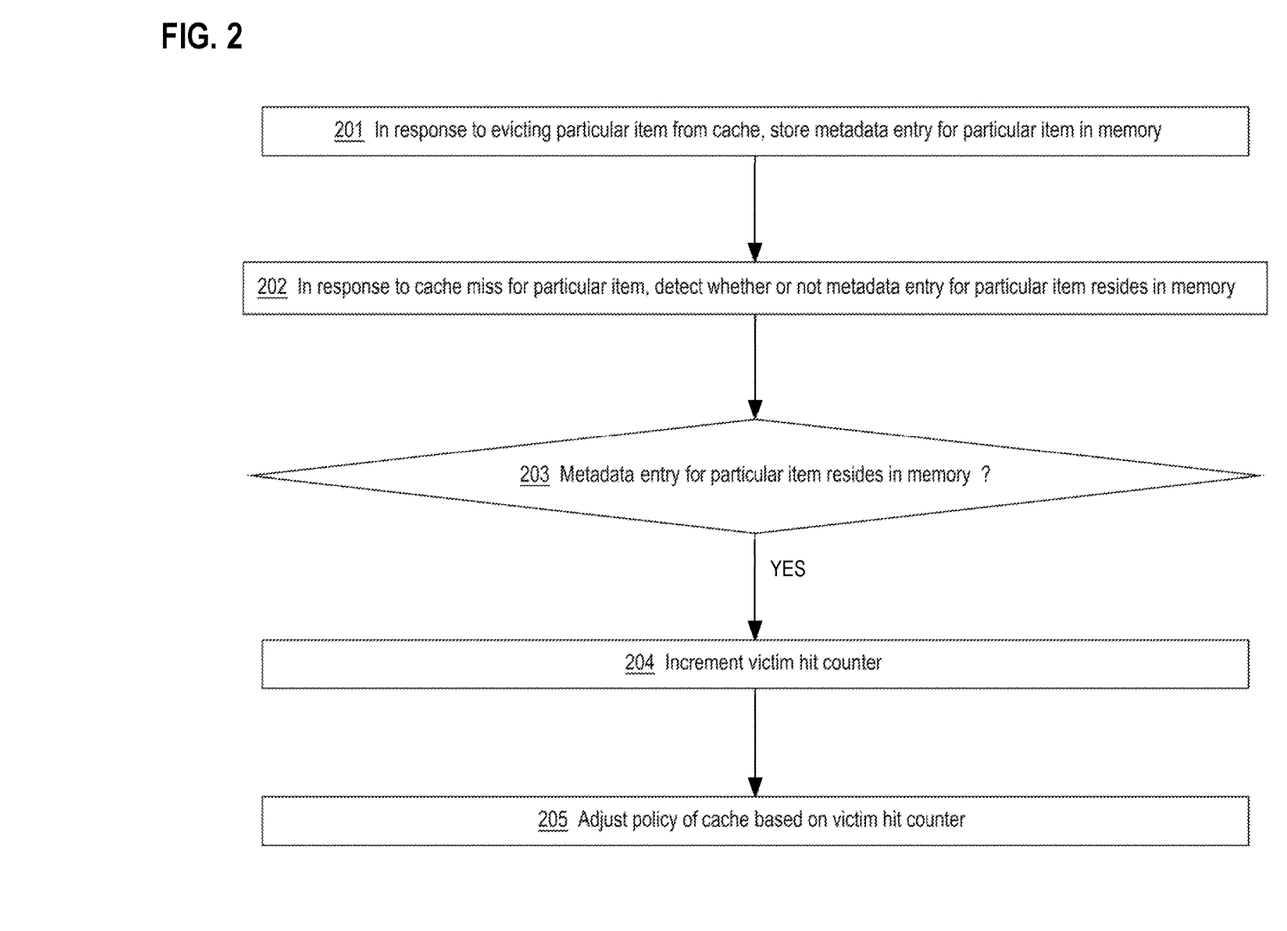
FIG. 2 is a flow diagram that depicts an example process that adjusts the behavior of a cache based on a count of cache misses for items recently evicted, in an embodiment.

FIG. 2 is a flow diagram that depicts an example process that adjusts the behavior of a cache based on a count of cache misses for items recently evicted. FIG. 2 is discussed with reference to FIG. 1.

3.1 Metadata Storage

For demonstrative purposes, this example assumes that cache 110 is already warm (filled with data items). Thus, cache 110 has no room for additional items unless other items are evicted. In some embodiments, neither the process of FIG. 2 nor the phenomenon of eviction require that cache 110 be full to capacity.

Although a cache miss is not shown for step 201, step 201 is responsive to eviction of a first item as caused by a cache miss for a second item. In step 201, a metadata entry for the first item is stored into memory. For example, computer 100 may receive a request to read item 122 when item 122 does not currently reside in the cache. To make room in cache 110 for item 122, computer 100 evicts item 121 and stores metadata entry 151 for item 121 into memory 140.

3.2 Metadata Detection

An arbitrary delay may separate steps 201-202. For example, step 201 may be caused by an access request for item 122. Whereas, step 202 may be caused by an access request for item 121. Item 121 is evicted in step 201 and then requested for access in step 202. However, because item 121 no longer resides in cache 110, request for item 121 causes a cache miss. In response to the cache miss, the computer detects whether or not a metadata entry for the missing item resides in memory. For example, the request for item 121 causes a cache miss, which causes computer 100 to detect whether or not metadata entry 151 for item 121 resides in memory 140.

In step 203, the computer reacts based on whether or not the metadata of the missing item was found in memory. Because metadata entry 151 for item 121 was recently stored in memory 140 when item 121 evicted in step 201, during steps 202-203, computer 100 does indeed find metadata entry 151 in memory 140.

3.3 Statistics

Having found metadata entry 151 in memory 140, computer 100 proceeds to step 204 from step 203. In step 204, a victim hit counter is incremented. For example, computer 100 increments victim hit counter 160 because computer 100 found metadata entry 151 in memory 140. An arbitrary delay may separate steps 204-205. For example, step 204 may be caused by an access request for item 121 in step 202. Whereas, when step 205 occurs and what triggers it depends on an implementation.

3.4 Tuning

In some embodiments, step 205 may be hard coded to occur (perhaps after detecting additional conditions) more or less immediately after step 204 and perhaps in a same computational thread as step 204. In some embodiments, step 205 occurs periodically, such as with an interval timer, and perhaps by a demon process or thread. In step 205, a policy of the cache is adjusted based on the victim hit counter. For example, a daemon thread may periodically awaken to inspect and/or reset (clear) victim hit counter 160. In step 205, computer 100 detects whether the value of victim hit counter 160 indicates that a current amount of avoidable thrashing is acceptable, too high, or too low. In preferred embodiments, characterization of thrashing as high or low depends on statistics that consider more measurements than victim hit counter 160 alone. For example, techniques based on a thrashing ratio are discussed later herein.

If the value of victim hit counter 160 indicates an acceptable amount of avoidable thrashing, then step 205 may complete without adjusting policy 130. However if the value of victim hit counter 160 indicates little or no avoidable thrashing, then cache 110 may be too big (have too much spare capacity), in which case some of the memory or flash that implements cache 110 may be temporarily reallocated to more productive use, such as storing BLOBs or sort spills. For example, computer 100 may detect that victim hit counter 160 has fallen beneath a low threshold, in which case computer 100 may reduce the size of cache 110 by adjusting policy 130 accordingly or achieve other effects by otherwise adjusting policy 130. Likewise, computer 100 may detect that victim hit counter 160 exceeds a high threshold, in which case computer 100 may increase the size of cache 110 by adjusting policy 130 accordingly or achieve other effects by otherwise adjusting policy 130. Thus in step 205, computer 100 may dynamically tune cache 110 by adjusting policy 130 to best allocate resources between cache 110 and other uses.

4.0 Metadata First-in First-Out (FIFO)

Figure 3:
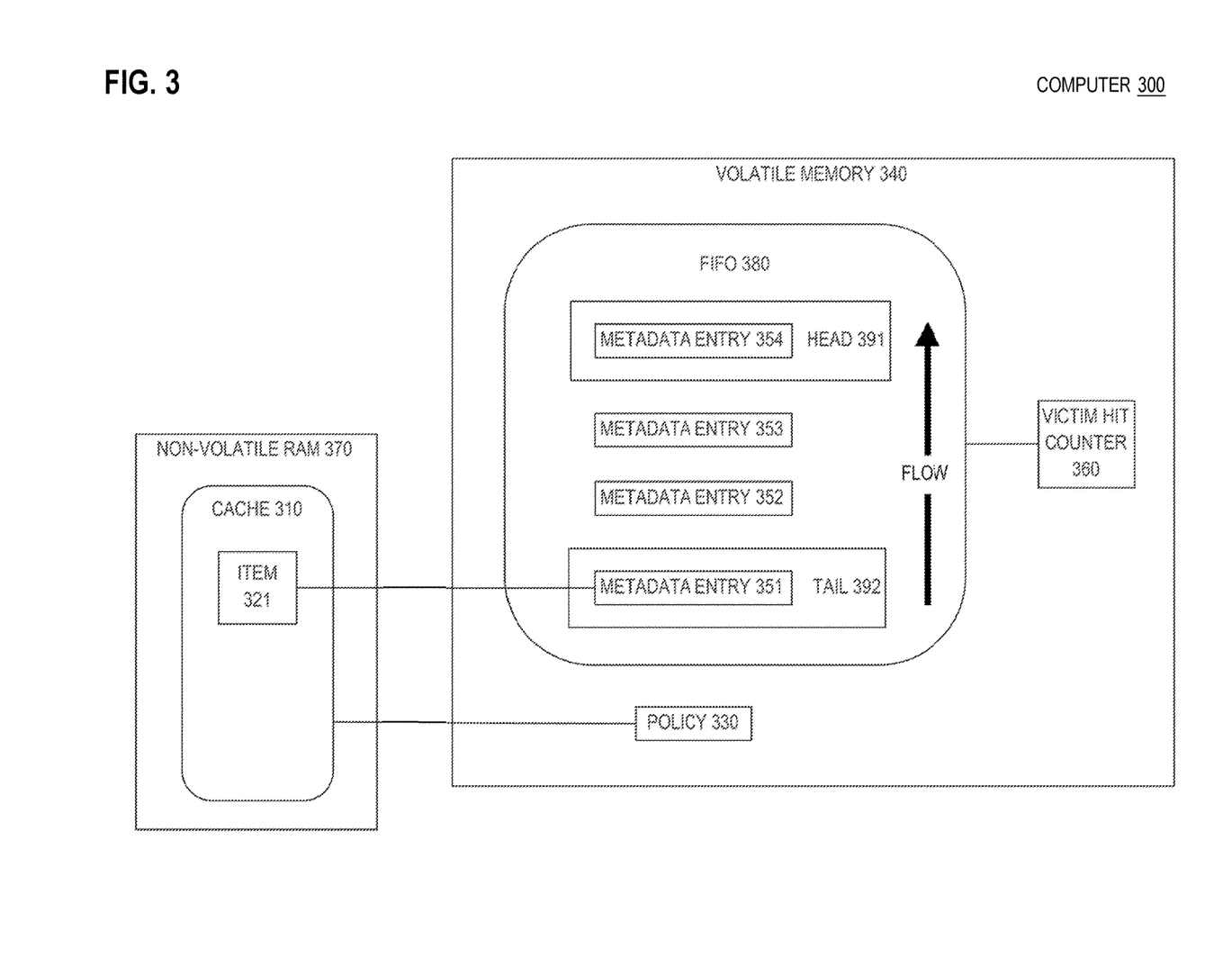
FIG. 3 is a block diagram that depicts an example computer that uses a first-in first-out (FIFO) to track recent evictions, in an embodiment.

FIG. 3 is a block diagram that depicts an example computer 300, in an embodiment. Computer 300 uses a first-in first-out (FIFO) to track recent evictions. Computer 300 may be an implementation of computer 100. Computer 300 contains volatile memory 340 and non-volatile RAM 370.

4.1 Tiered Memory

Non-volatile RAM 370 may have integrated circuitry based on technology such as flash, phase change memory, ferroelectric circuits, or other non-volatile RAM technology. Thus, computer 300 has increased reliability because dirty data (recent modifications) are preserved in non-volatile RAM 370 even if computer 300 crashes and needs rebooting. Non-volatile RAM 370 contains cache 310 that stores data items such as 321. Computer 300 may dynamically adjust policy 330 to tune (optimize) the configuration and behavior of cache 310.

Volatile memory 340 may be RAM of higher speed, higher density, higher capacity, and/or lower manufacturing cost than non-volatile RAM 370. Volatile memory 340 contains first-in first-out (FIFO) 380, which computer 300 operates as a queue of metadata entries, such as 351-354.

Because FIFO 380 may reside in inexpensive bulk RAM, such as DRAM, FIFO 380 may be huge. For example, FIFO 380 may have a physical capacity of more than two gigabytes. According to simulation, FIFO sizes ranging from two to five gigabytes are not too big to deliver substantial benefit for generating victim statistics. Indeed, FIFO 380 works well when sized to store hundreds of thousands of metadata entries. However when FIFO 380 is sized above some immense (e.g. 5 gigabyte) threshold, marginal benefit diminishes, and performance of cache 310 may cease to proportionally increase.

4.2 FIFO Data Flow

FIFO 380 stores a sequence of metadata entries that extends from head 391 to tail 392. When item 321 is evicted from cache 310, computer 300 operates FIFO 380 as follows. If FIFO 380 is already filled to capacity with metadata, then computer 300 removes from FIFO 380 whichever metadata entry occupies head 391. In this example when item 321 is evicted, computer 300 removes metadata entry 354 from FIFO 380.

Removal of a metadata entry at head 391 causes head 391 to be retargeted to a next metadata entry in FIFO 380. In this example, removal of metadata entry 354 causes head 391 to be retargeted (not shown) to the next metadata entry, which is 353. Removal of a metadata entry at head 391 causes a vacancy within FIFO 380. Computer 300 uses that available capacity by appending metadata entry 351 (of item 321) onto the end of FIFO 380. That causes tail 392 to be retargeted to metadata entry 351 as shown. Thus, metadata entries of the most recently evicted items are appended to tail 392, and metadata entries of the least recently evicted items are removed from head 391. Thus, metadata entries flow into, along, and out of FIFO 380 in the direction shown by the vertical arrow labeled 'flow'. Thus, FIFO 380 has a bounded (fixed) capacity dedicated to metadata entries of the most recently evicted items.

4.3 FIFO Inspection

Computer 300 increments victim hit counter 360 when FIFO 380 contains a metadata entry of an item that experiences a cache miss. In this example after 321 was evicted, metadata entry 351 of item 321 was appended to FIFO 380. Thus, a subsequent attempt to find item 321 within cache 310 will cause a cache miss because cache 310 no longer contains item 321. Computer 300 detects that FIFO 380 contains metadata entry 351, which causes computer 300 to increment victim hit counter 360. Thus, FIFO 380 should be searchable, such that computer 300 can efficiently detect the presence of a given metadata entry. For example, FIFO 380 may be content addressable for metadata lookup in constant time. An alternative search mechanism such as brute-force linear scanning of FIFO 380 may or may not be fast enough.

4.4 Metadata Removal

Per conventional caching when item 321 causes a cache miss, computer 300 loads item 321 into cache 310, regardless of whether or not FIFO 380 contains metadata entry 351. However if FIFO 380 does contain metadata entry 351, then computer 300 removes metadata entry 351 from FIFO 380. Although not shown as such, metadata entry 351 may be in the middle of FIFO 380 when removed. Thus, FIFO 380 should support removal of any metadata entry, regardless of position within FIFO 380. Discussed later herein is FIG. 5 that can be used to implement a flexible FIFO.

5.0 Equilibrium Thresholds

Figure 4:
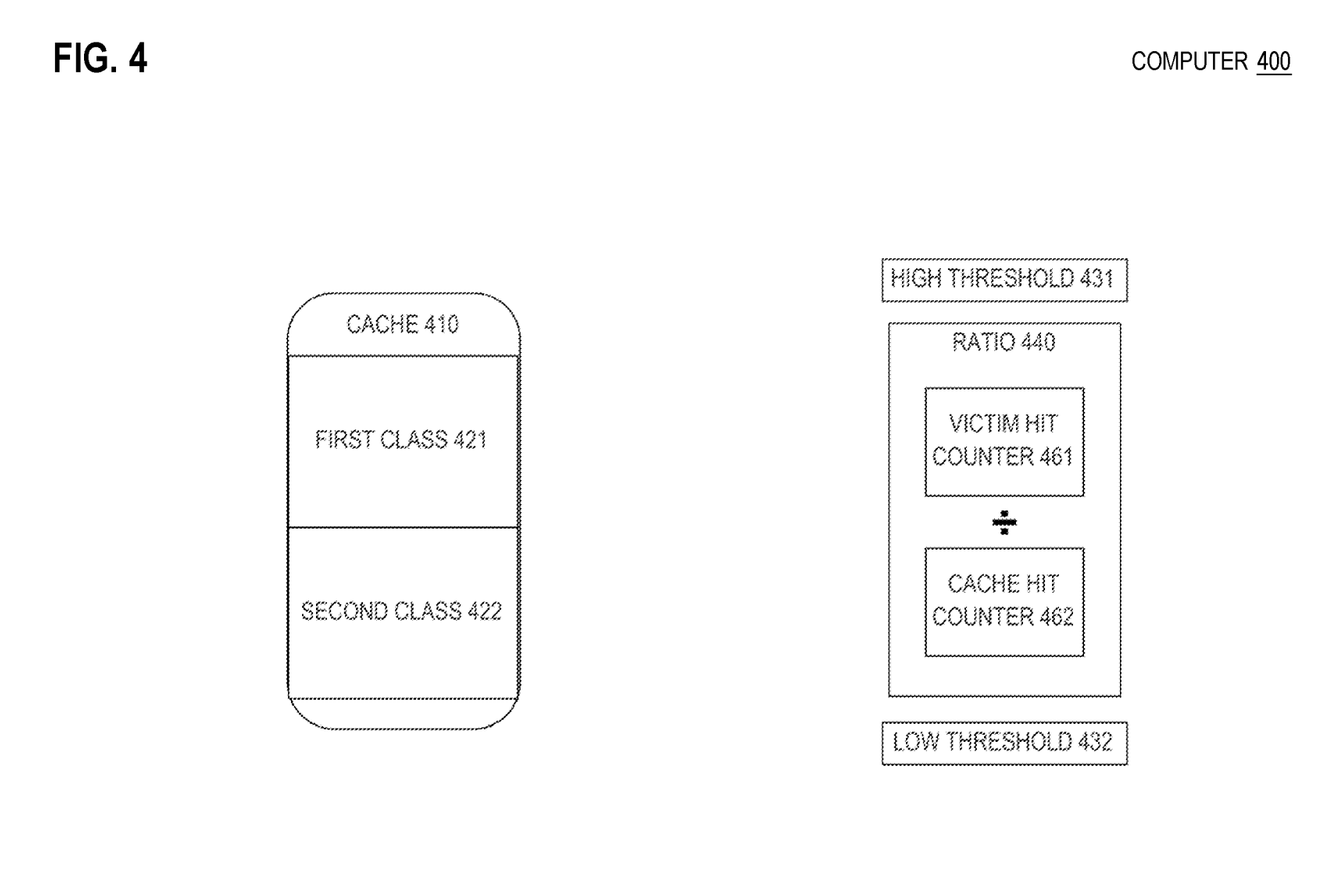
FIG. 4 is a block diagram that depicts an example computer that uses thrashing thresholds to maintain equilibrium, in an embodiment.

FIG. 4 is a block diagram that depicts an example computer 400, in an embodiment. Computer 400 uses thrashing thresholds to maintain equilibrium. Computer 400 may be an embodiment of computer 100. Computer 400 contains cache 410 and thrashing thresholds 431-432.

Computer 400 has a FIFO (not shown) for storing metadata entries of items that were recently evicted from cache 410. Computer 400 uses hit counters 461-462 to record statistics about the FIFO and cache 410. If a request to access an item can be fulfilled from cache 410, then computer 400 increments cache hit counter 462. Otherwise there is a cache miss, and computer 400 increments victim hit counter 461 if the item's metadata entry resides in the FIFO.

5.1 Thrashing Ratio

Thus, computer 400 uses hit counters 461-462 to detect cache effectiveness (cache hit counter 462) and the potential effectiveness of increasing cache capacity (victim hit counter 461). Using those counters, computer 400 detects a level of avoidable thrashing of cache 410 by dividing the value of victim hit counter 461 by the value of cache hit counter 462 to calculate ratio 440.

The value of ratio 440 may fluctuate with a quantity and quality of request workload. In response to fluctuation of ratio 440, computer 400 may reconfigure cache 410 to opportunistically maximize throughput. Cache 410 may have a small working set of items that are frequently hit. Thus, cache hit counter 462 may be high, and ratio 440 may be low. If the value of ratio 440 drops below low threshold 432, then avoidable thrashing is low and cache 410 may be bigger than needed. Thus, computer 400 may respond to ratio 440 falling beneath low threshold 432 by shrinking (reducing the capacity of) cache 410. Shrinking cache 410 may increase system throughput by freeing up memory or flash for other purposes. However with dynamically changing workload, cache 410 may be too small to avoid thrashing. The smaller is cache 410, the more prone it will be to evict items. If evicted items are frequently accessed, then victim hit counter 461 and ratio 440 may be high, which indicates avoidable thrashing. Thus if ratio 440 exceeds high threshold 431, then cache 410 avoidably thrashes too much. Computer 400 may respond to ratio 440 exceeding high threshold 431 by growing (increasing the capacity of) cache 410. By reactively keeping ratio 440 between thresholds 431-432, computer 400 may dynamically resize cache 410 based on actual workload. Thus, computer 400 maintains homeostasis for the performance/efficiency of cache 410, despite fluctuating workload characteristics.

5.2 I/O Latency

As explained above, a thrashing ratio may be used to characterize thrashing as excessive or acceptable. In some embodiments, average input/output (I/O) latency may also or instead be used to characterize thrashing. I/O latency is relevant because even when there is a high cache hit rate (e.g. >99%), each cache miss may be very costly if an involved hard disk is overwhelmed with activity and incurs latency much higher than that of a flash drive. Thus, I/O latency may be used as a proxy or estimation factor of thrashing with which to characterize thrashing as acceptable or excessive. I/O latency may or may not actually measure thrashing. However, I/O latency more or less accurately measures the cost of a cache miss, which may be as relevant or more relevant than other predictive performance measurements discussed herein. Thus, I/O latency may be important to measure and integrate into thrashing detection instrumentation. Average I/O latency is calculated as follows.

(average hard disk latency in the last time period)*
(number of cache misses in last time period)+
(average flash drive latency in the last time period)*(number of cache hits in last time period)

The above formula calculates average actual I/O latency as observed without considering victim cache metrics. Actual (recent) I/O latency has some predictive utility for characterizing thrashing. Ideally, potential (future) I/O latency is also considered when characterizing thrashing. Potential I/O latency may be calculated by integrating observed I/O latency and victim cache metrics according to the following formula.

(average hard disk latency in last time period)*
(number of cache misses in last time period−
additional potential hits according to victim cache)+(average flash disk latency in last time period)*(number of cache hits in last time period+additional potential hits according to victim cache)

Thus, potential I/O latency may be more or less predictive. Whereas, actual I/O latency is retrospective.

Actual I/O latency may be compared to potential I/O latency to characterize thrashing. When the ratio between the actual I/O latency and the potential I/O latency exceeds a threshold, then thrashing may be characterized as excessive, even if the thrashing ratio does not indicate excessive thrashing. Thus, thrashing may be characterized as excessive when either a thrashing ratio or an I/O latency ratio exceeds a respective threshold. Thus, cache 410 may be accordingly tuned based on the performance of cache 410 and/or the performance of its backing store (hard disk).

5.3 Data Categories

Furthermore, cache 410 may store different categories of items. Cache 410 may have a partition for storing items of each category, such as classes 421-422. Each category may have a different priority and/or need a different quality of service (QoS). For example, first class 421 may be online transaction processing (OLTP) data items, which are high priority. Whereas, second class 422 may be low priority data items. For example, second class 422 may store items such as binary large objects (BLOBs) or temporary data such as a sort spill (overflow) from volatile memory. For example, first class 421 may be so important that second class 422 should be cached only when first class 421 would not be impacted by avoidable thrashing. Thus, the cache adjustment logic of computer 400 may be dedicated to protecting the quality of service for OLTP items in first class 421. Thus, computer 400 may use the metadata FIFO and hit counters 461-462 to track only performance of first class 421 within cache 410. Thus, hit counters 461-462 are incremented only when an OLTP (first class) data item is involved. For example, a cache hit would increment cache hit counter 462 only if the item resides in first class 421 and not second class 422.

5.4 Cache Partitions

To maximize system throughput, computer 400 may dynamically resize the cache partitions for classes 421-422 based on actual workload. For example when ratio 440 falls below low threshold 432, first class partition 421 is bigger than actually needed, and computer 400 may resize the cache partitions of classes 421-422 by shifting some idle capacity from first class 421 to second class 422. Thus, second class 422 may opportunistically expand to accommodate more low priority items when first class 421 is underutilized. Whereas if cache 410 begins to avoidably thrash, and ratio 440 exceeds high threshold 431, then computer 400 may restore first class 421 by shifting capacity from second class 422 back to first class 421. In that way, the partition division between classes 421-422 may move back and forth to maximize system throughput despite fluctuating actual load.

6.0 Data Structures

Figure 5:
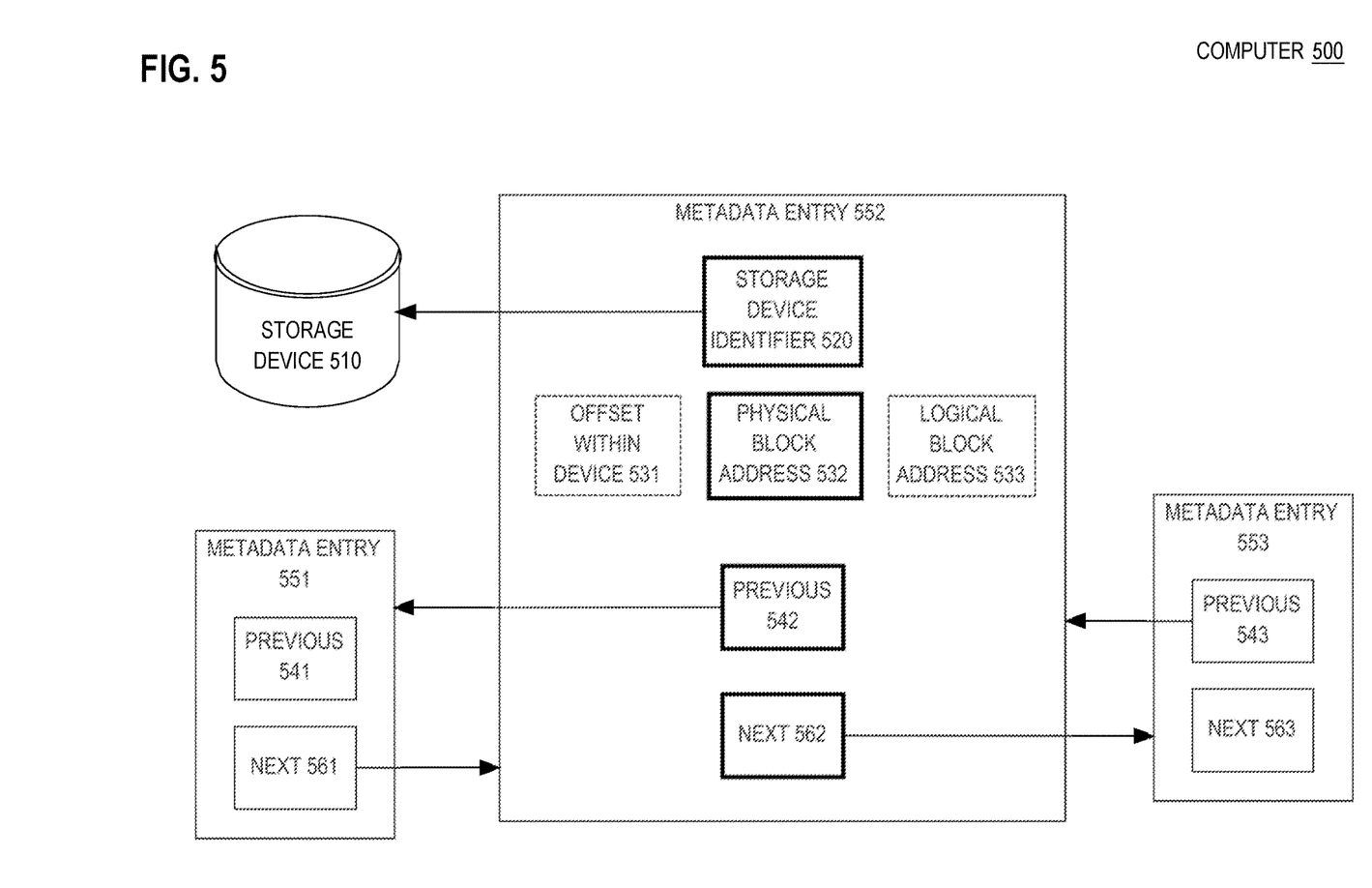
FIG. 5 is a block diagram that depicts an example computer that operates a doubly-linked list as a metadata FIFO, in an embodiment.

FIG. 5 is a block diagram that depicts an example computer 500, in an embodiment. Computer 500 uses a doubly-linked list to implement a metadata FIFO. Computer 500 may be an embodiment of computer 100. Computer 500 contains a metadata FIFO of metadata entries, such as 551-553, having forward and backward pointers that link the elements.

6.1 Linked List

Computer 500 may append metadata entries to the tail of the FIFO and remove metadata entries from the head of the FIFO. Each metadata entry in the FIFO has a previous pointer that refers to the previous metadata entry in the FIFO. For example, metadata entry 552 has previous 542 that points to metadata entry 551. Thus, metadata entry 552 occurs in the FIFO after metadata entry 551. Likewise, each metadata entry in the FIFO has a next pointer that refers to the next metadata entry in the FIFO. For example, metadata entry 551 has next 561 that points to metadata entry 552.

When computer 500 appends a metadata entry to the tail of the FIFO, computer 500 should assign a previous pointer and a next pointer. For example when metadata entry 553 is appended, computer 500 sets next 562 in metadata entry 552 to point to metadata entry 553, and sets previous 543 in metadata entry 553 to point to metadata entry 552. When computer 500 removes a metadata entry from the head of the FIFO, computer 500 should clear a previous pointer. For example when metadata entry 551 is removed, computer 500 clears previous 542 in metadata entry 552 so that it no longer points to metadata entry 551 (which is removed).

Implementing the FIFO with a linked list enables metadata entries to be quickly added or removed and with more predictable latency. If only the head and tail of the FIFO were mutable, then computer 500 could instead use a circular queue as the FIFO. However, computer 500 removes a metadata entry from the middle of the FIFO when that metadata entry is for a data item that suffers a cache miss and is reloaded into the cache. When a data item is reloaded into cache, computer 500 should remove the associated metadata entry, even if the metadata entry resides in the middle of the FIFO. Because circular buffer performance may be slow for removing an entry from the middle, computer 500 instead uses a linked list (as shown) for the FIFO.

6.2 Metadata Details

Also shown are possible implementations of metadata content. Some metadata implementations may perform better than others. For best performance, each metadata entry should contain a unique identifier of the corresponding data item. In this example, the unique identifier is a compound identifier that consists of multiple fields. For example, each cacheable data item may reside at a particular location within one of many disks. For example, metadata entry 552 may correspond to a data item, such as a disk storage block or database page, that resides at a particular location within storage device 510, which may be a mechanical disk, a flash drive, a network drive, or other durable bulk storage. Thus, metadata entry 552 may contain a compound unique identifier that include storage device identifier 520 (e.g. identifier of storage device 510) and a location field. The location field may be implementation dependent such as a physical block address 532 or logical block address 533 (that a driver for storage device 510 may translate into a physical block address).

In some implementations, the location field of the unique identifier does not identify a block, but may instead be a byte or word address or other offset into the capacity of storage device 510, such as offset 531. Thus although location fields 531-533 are shown, a metadata implementation would only have one of those fields (in addition to storage device identifier 520). In an embodiment, metadata entry 552 comprises a 4-byte storage device identifier 520, a 4-byte offset or address such as one of 531-533, and 8-byte pointers 542 and 562. Thus, metadata entry 552 may be readily packed into as little as 24 bytes. In an embodiment, the fields of metadata entry 552 are word aligned instead of packed into 24 bytes. Thus, metadata entry 552 may need 32 bytes for well-aligned storage.

6.3 Random Access

As explained above, a victim FIFO should support removal of any metadata entry, regardless of position within the FIFO. A linked list is often used for a general purpose FIFO due to fast mutation (append or remove). However, a simple linked list does not support random access. Random access can accelerate finding a particular metadata entry within the FIFO. Thus, the FIFO may supplement the linked list with an associative map, such as a hash table. For example, Java has a LinkedHashMap that provides methods that support semantics of both a random-access map (e.g. containsKey) and a bounded-capacity FIFO (e.g. remove EldestEntry).

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
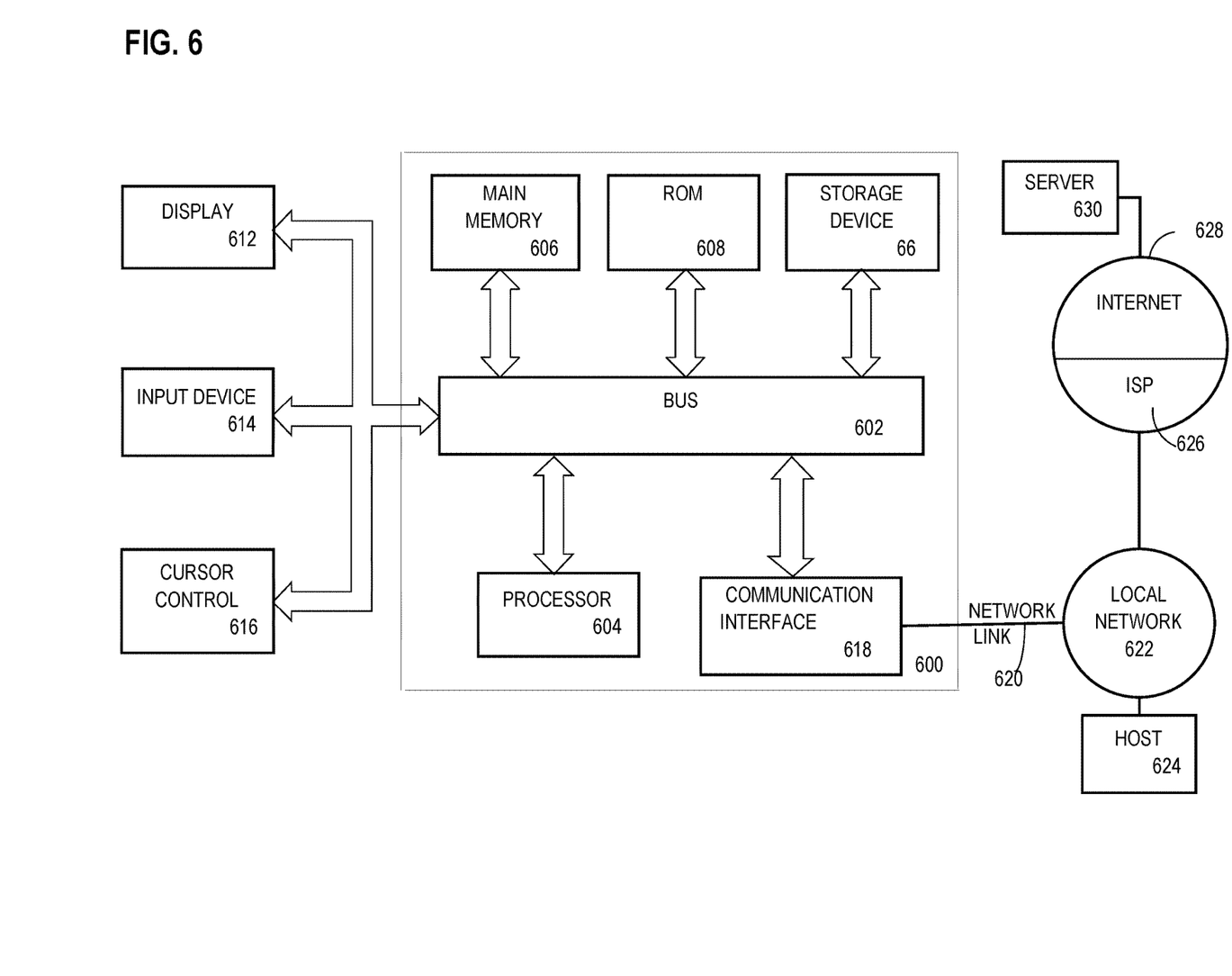
FIG. 6 is a block diagram that illustrates an example computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

5.0 Software Overview

Figure 7:
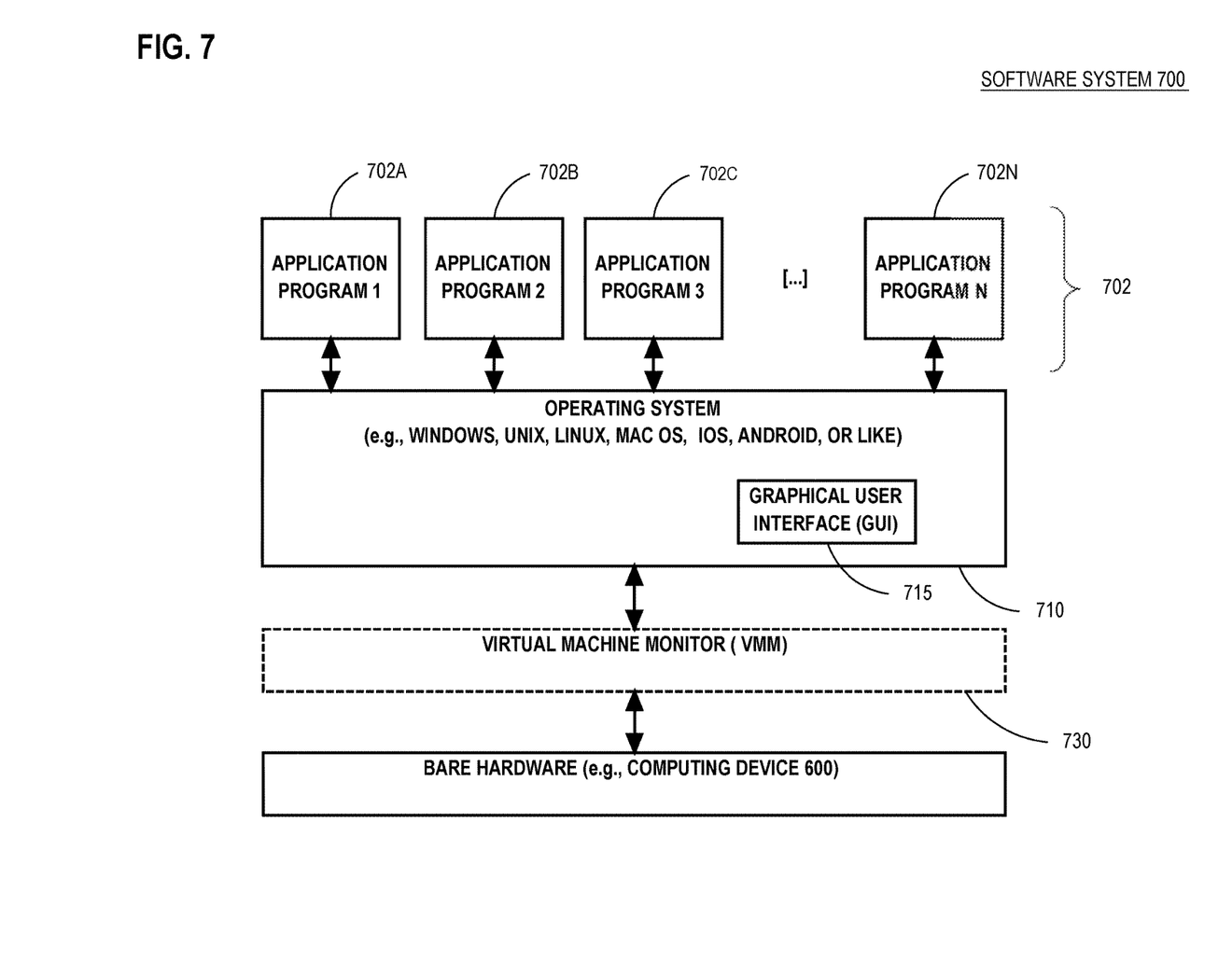
FIG. 7 is a block diagram that illustrates an example software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 66, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 66 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 104) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

6.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing in memory, in response to evicting a particular item from a cache, a metadata entry for the particular item;
detecting, in response to a cache miss for the particular item, whether or not the metadata entry for the particular item resides in memory;
incrementing, when the metadata entry for the particular item is detected in memory, a victim hit counter;
incrementing, when a second metadata entry for a second item is detected in memory, same said victim hit counter;
adjusting, based on the victim hit counter, a policy of the cache.

2. The method of claim 1 wherein:
the memory comprises a first-in first-out (FIFO) of metadata for a plurality of items, wherein the FIFO comprises a head and a tail;
storing the metadata entry for the particular item in memory comprises:
removing a metadata entry for another item from the head of the FIFO;
appending the metadata entry for the particular item to the tail of the FIFO.

3. The method of claim 1 further comprising:
storing, after evicting the particular item, the particular item into the cache;
removing the metadata entry for the particular item from the memory.

4. The method of claim 1 wherein:
the method further comprises incrementing, during a hit in the cache, a cache hit counter;
the adjusting is further based on the cache hit counter.

5. The method of claim 4 wherein the adjusting is further based on at least one of: a ratio of the victim hit counter to the cache hit counter, or a ratio of a victim hit rate to a cache hit rate.

6. The method of claim 5 wherein:
adjusting the policy of the cache comprises at least one of:
increasing, when the ratio exceeds a first threshold, a size of the cache;
decreasing, when a second threshold exceeds the ratio, the size of the cache.

7. The method of claim 5 wherein:
the policy of the cache includes distinguishing first-class items from second-class items;
adjusting the policy of the cache comprises at least one of:
decreasing, when the ratio exceeds a first threshold, how much of the cache is reserved for first-class items;
increasing, when a second threshold exceeds the ratio, how much of the cache is reserved for first-class items.

8. The method of claim 4 wherein only items of a particular subset of classes are counted during at least one of: said incrementing the victim hit counter, or said incrementing the cache hit counter.

9. The method of claim 1 wherein the policy of the cache includes distinguishing first-class items from second-class items.

10. The method of claim 9 wherein adjusting the policy of the cache comprises adjusting how much of the cache is reserved for first-class items.

11. The method of claim 1 wherein adjusting the policy of the cache comprises adjusting a size of the cache.

12. The method of claim 1 wherein said adjusting a policy of the cache is further based on an input/output (I/O) latency metric of a backing store of the cache.

13. The method of claim 2 wherein the FIFO contains more metadata entries than the cache contains items.

14. The method of claim 1 wherein said metadata entry contains at least one of: a device identifier, a block identifier, or a reference to a second metadata entry.

15. One or more non-transitory computer-readable media storing instructions that, when executed by one or more processors, cause:
storing in memory, in response to evicting a particular item from a cache, a metadata entry for the particular item;
detecting, in response to a cache miss for the particular item, whether or not the metadata entry for the particular item resides in memory;
incrementing, when the metadata entry for the particular item is detected in memory, a victim hit counter;
incrementing, when a second metadata entry for a second item is detected in memory, same said victim hit counter;
adjusting, based on the victim hit counter, a policy of the cache.

16. The one or more non-transitory computer-readable media of claim 15 wherein:
the memory comprises a first-in first-out (FIFO) of metadata for a plurality of items, wherein the FIFO comprises a head and a tail;
storing the metadata entry for the particular item in memory comprises:
removing a metadata entry for another item from the head of the FIFO;
appending the metadata entry for the particular item to the tail of the FIFO.

17. The one or more non-transitory computer-readable media of claim 15 wherein the instructions, when executed by one or more processors, further cause:
storing, after evicting the particular item, the particular item into the cache;
removing the metadata entry for the particular item from the memory.

18. The one or more non-transitory computer-readable media of claim 15 wherein:
the instructions, when executed by one or more processors, further cause incrementing, during a hit in the cache, a cache hit counter;
the adjusting is further based on the cache hit counter.

19. The one or more non-transitory computer-readable media of claim 18 wherein the adjusting is further based on at least one of: a ratio of the victim hit counter to the cache hit counter, or a ratio of a victim hit rate to a cache hit rate.

20. The one or more non-transitory computer-readable media of claim 18 wherein only items of a particular subset of classes are counted during at least one of: said incrementing the victim hit counter, or said incrementing the cache hit counter.

21. The one or more non-transitory computer-readable media of claim 15 wherein adjusting the policy of the cache comprises adjusting a size of the cache.

22. The one or more non-transitory computer-readable media of claim 15 wherein said adjusting a policy of the cache is further based on an input/output (I/O) latency metric of a backing store of the cache.

* * * * *

UNITED STATES PATENT AND TRADEMARK OFFICE
CERTIFICATE OF CORRECTION

PATENT NO. : 10,331,573 B2
APPLICATION NO. : 15/687296
DATED : June 25, 2019
INVENTOR(S) : Justin Matthew Lewis et al.

Page 1 of 1

It is certified that error appears in the above-identified patent and that said Letters Patent is hereby corrected as shown below:

In the Specification

In Column 1, Line 8, delete "14" and insert -- 4 --.

Signed and Sealed this
Twenty-seventh Day of August, 2019

Andrei Iancu
*Director of the United States Patent and Trademark Office*